(12) United States Patent
Wheelwright et al.

(10) Patent No.: US 7,195,280 B2
(45) Date of Patent: Mar. 27, 2007

(54) HIGH INTERNAL PRESSURE FABRIC AIRBAG WITH EXPOSED INFLATOR

(75) Inventors: Terry A. Wheelwright, Morgan, UT (US); James L. Nelson, Logan, UT (US)

(73) Assignee: Autoliv ASP, Inc., Ogden, UT (US)

( * ) Notice: Subject to any disclaimer, the term of this patent is extended or adjusted under 35 U.S.C. 154(b) by 404 days.

(21) Appl. No.: 10/717,815

(22) Filed: Nov. 20, 2003

(65) Prior Publication Data

US 2005/0110244 A1 May 26, 2005

(51) Int. Cl.
*B60R 21/16* (2006.01)
(52) U.S. Cl. ............... 280/743.1; 280/732; 280/728.1
(58) Field of Classification Search ............ 280/728.1, 280/728.2, 730.2, 741, 743.1, 740, 736; B60R 21/16
See application file for complete search history.

(56) References Cited

U.S. PATENT DOCUMENTS

| | | | | |
|---|---|---|---|---|
| 4,153,273 A * | 5/1979 | Risko | .................. | 280/740 |
| 5,022,675 A * | 6/1991 | Zelenak et al. | .......... | 280/743.1 |
| 5,632,506 A * | 5/1997 | Shellabarger | ............ | 280/743.1 |
| 5,667,241 A | 9/1997 | Bunker et al. | | |
| 5,810,390 A | 9/1998 | Enders et al. | | |
| 5,857,696 A * | 1/1999 | Inoue et al. | .............. | 280/728.2 |
| 6,299,204 B1 * | 10/2001 | Keshavaraj | ............... | 280/743.1 |
| 6,299,206 B1 * | 10/2001 | Keshavaraj | ............... | 280/743.1 |
| 6,447,003 B1 | 9/2002 | Wallentin et al. | | |
| 6,460,877 B2 * | 10/2002 | Tanabe et al. | .............. | 280/729 |
| 6,588,793 B2 | 7/2003 | Rose | | |
| 6,802,526 B2 * | 10/2004 | Dumbrique et al. | ...... | 280/728.2 |

FOREIGN PATENT DOCUMENTS

EP 1 273 486 1/2003

\* cited by examiner

*Primary Examiner*—Ruth Ilan
*Assistant Examiner*—Tiffany L. Webb
(74) *Attorney, Agent, or Firm*—Sally J Brown; Madson & Austin

(57) ABSTRACT

An inflatable fabric cushion is disclosed that can maintain a high internal pressure while having an exposed inflator squib. The inflatable cushion has a precision opening sized to be commensurate with a diameter of the inflator squib. The precision opening tightly circumscribes the inflator to limit leakage of inflation gas when the squib projects out of the opening. The cushion also has a throat through which the inflator may be inserted into the cushion. After the inflator is inserted into the cushion, the throat is sealed closed by wrapping the throat around the inflator housing and being cinched when the airbag assembly is mounted on a vehicle.

23 Claims, 3 Drawing Sheets

HIGH INTERNAL PRESSURE FABRIC AIRBAG WITH EXPOSED INFLATOR

BACKGROUND OF THE INVENTION

1. Field of the Invention

The present invention relates to inflatable fabric airbag applications for limiting the escape of inflation gas around the inflator. More specifically, the present invention relates to airbag designs that can achieve and maintain high internal pressures while having a partially exposed inflator.

2. Description of Related Art

Inflatable safety restraint devices, or airbags, are well accepted for use in motor vehicles and have been credited with preventing numerous deaths and injuries. Inflatable airbags are now mandatory on most new vehicles. Airbags are typically installed as part of a system with an airbag module in the steering wheel on the driver's side of a car and in the dashboard on the passenger side of a car. In the event of an accident, a sensor within the vehicle measures abnormal deceleration and triggers the ignition of a charge contained within an inflator. Expanding gases from the charge travel through conduits and fill the airbags, which immediately inflate in front of the driver and passenger to protect them from harmful impact with the interior of the car.

During a front end collision, there is a tendency for an occupant, particularly one who is not properly restrained by a seat belt, to slide forward along the seat and "submarine" under the airbag (hereinafter referred to as the "primary airbag"). When the occupant submarines, the primary airbag is less effective in protecting the occupant. Such submarining causes the vehicle occupant's knees to contact the instrument panel or structure beneath the panel. Further injuries can occur when the occupant's legs move forward such that the knees are trapped in or beneath the instrument panel just before the foot well collapses. As the foot well collapses, the vehicle occupant's feet are pushed backward, which causes the knees to elevate and become further trapped. As the foot well continues to crush, the load on the trapped legs increase and can cause foot, ankle, and tibia injuries.

In order to prevent such injuries, inflatable knee airbag systems have been developed to engage an occupant's knees or lower legs and prevent submarining under the primary airbag. Knee airbag systems are generally positioned in the lower portion of the instrument panel. The use of fabric airbags in knee airbag applications presents particular problems. An occupant's legs have a very small contact area, and therefore exhibit a high force over a small area when in contact with the cushion. The lower legs tend to "knife" through the fabric airbag if there is not sufficient internal pressure to withstand such force. In order to prevent knifing through the airbag chamber, fabric knee airbags need to be inflated to two to three times the pressure normally applied in conventional fabric airbag systems.

Furthermore, in an effort to further improve driver and passenger safety, side-impact airbags have been developed. These airbags function by providing a buffer between the side of a vehicle and the body of a driver or passenger of the vehicle during accidents in which the side of the vehicle is struck by another vehicle or other object. This class of airbags was typically designed to deploy from a compartment within the occupant's seat. The seat mounted airbag may inflate beside an occupant to protect the pelvis and thorax of the occupant against lateral impact.

However, side airbags need to maintain higher cushion pressures during the initial stages of deployment to enable the airbag to break out of the plastic airbag housing module and the seam of the seat. Consistent seat breakout has been a problem at low temperatures, e.g., −40 degrees Celsius, and with inflators that perform at the lower end of the Bell curve with respect to the amount of inflation gas generated compared to other inflators. Insufficient internal pressure is usually the reason for failed seat breakout at low temperatures and for lower limit inflator performance. Furthermore, if the internal pressure of the side airbag is inadequate, the likelihood of a vehicle occupant striking the wall of the vehicle despite the existence of the airbag is increased. Such an event is called a "strikethrough" and may be attributed to insufficient internal pressure.

One reason side and knee airbags are unable to achieve and maintain high internal pressures is that inflation gases are able to escape the cushion through the cushion opening that receives the inflator. One method previously employed to try and limit exiting inflation gases is to fold a fabric flap or flaps over the opening through which the inflator was inserted. This method, however, is not able to consistently maintain the high pressures needed for knee and side airbag applications because gaps still exist between the inflator and the airbag fabric.

Another previously employed method to restrict the exiting of inflation gases adjacent the inflator is to completely enclose the inflator within the cushion. However, it is difficult to assemble the inflator into the cushion in high pressure airbag designs. First, the wire harness connected to the inflator exiting the cushion can be pinched easily between the inflator housing and the airbag module housing. Second, a completely internal inflator requires additional electrical check to ensure that the electrical characteristics are still functioning properly. Third, push/pull testing is required in which a universal connector snaps into the inflator and 10 pounds of force is applied to each line to ensure proper connection to the inflator. Consequently, a fully enclosed inflator requires additional time consuming and costly procedures to ensure the inflator will function properly.

Accordingly, a need exists for an inflatable fabric cushion that can receive an inflator, but provide for an exposed inflator squib exterior to the cushion. A need also exists for an inflatable fabric cushion that can be sealed about its openings adjacent a partially enclosed inflator to limit the escape of inflation gas. Furthermore, a need exists for a fabric knee or side airbag that can maintain high internal pressures in order to prevent occupant strikethrough or knifing through the inflated cushion, and effective seat breakout in side airbag applications. Such a device is disclosed and claimed herein.

SUMMARY OF THE INVENTION

The apparatus of the present invention has been developed in response to the present state of the art, and in particular, in response to the problems and needs in the art that have not yet been fully solved by currently available inflatable fabric cushions that have exposed inflator squibs. Thus, the present invention is to provide an inflatable fabric cushion that can receive an inflator and have the inflator squib project out of the inflatable cushion, yet prevent the major escape of inflation gas adjacent to the inflator squib when the inflator is activated.

The inflatable cushion of the present invention is particularly desirable in knee or side airbag applications that require the maintenance of high internal pressures upon activation of the inflator. High pressure is needed in fabric knee airbag applications to prevent an occupant's knees from "knifing" through the inflatable chamber. Furthermore, side airbags require high pressure to enable the airbag to break out of the airbag module and a seam in the seat where the side airbag module is located. Therefore, by limiting the passage of inflation gases adjacent the inflator, the inflatable cushion of the present invention can successfully maintain the needed high internal airbag pressure.

In accordance with the invention as embodied and broadly described herein in the preferred embodiment, an inflatable fabric cushion with a precision opening for the inflator squib is provided. The inflator squib is the portion of the inflator that is electrically initiated to trigger a pyrotechnic or similar activating device. The opening in the inflatable cushion may be a precision lasered hole which has a diameter commensurate with the diameter of the inflator squib. By tightly circumscribing the inflator squib, there are no gaps in the opening through which inflation gases may escape in large proportions adjacent the inflator.

The inflator may have a housing with a diameter greater than the diameter of the squib. This type of inflator would only allow the squib to project through the opening, while the housing would not fit through the precision lasered hole. The opening is sealed thereby from escaping inflation gas. The inflator may also have orthogonally projecting mounting studs that extend from the inflator housing. The studs may protrude through designated portions of the inflatable cushion to be able to mount to a desired location on a vehicle.

The inflatable cushion also comprises a throat that functions as a passageway through which the inflator may be inserted inside the inflatable cushion. The throat is separate from the opening through which the inflator squib projects. The throat has two lateral seams that run parallel with the inflator body once in place inside the inflatable cushion. The lateral seams restrict the size of the throat passageway and help to seal the throat once the inflator is in place. The throat also has several mounting stud holes on either side of the lateral seams for engaging with the mounting studs that project from the inflator housing.

The inflator may be inserted into the throat passageway and maneuvered around the two lateral seams to engage the mounting stud holes and the precision opening through which the inflator squib projects. Once the inflator is in place, the throat is wrapped around the inflator housing and the remaining mounting stud holes on the throat engage with the projecting mounting studs on the inflator. The airbag assembly can then be mounted to a desired location in a vehicle. By mounting the inflator in its desired position, the wrapped throat is cinched and the throat passageway is thereby sealed to prevent the passage of inflation gas. The lateral seams also serve to help seal the throat closed in addition to the cinching of the wrapped throat.

The sealed throat and the precision lasered hole prevent major leakage of inflation gases for high pressure airbag applications while still enabling the inflator squib to project outside the cushion. These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 2:
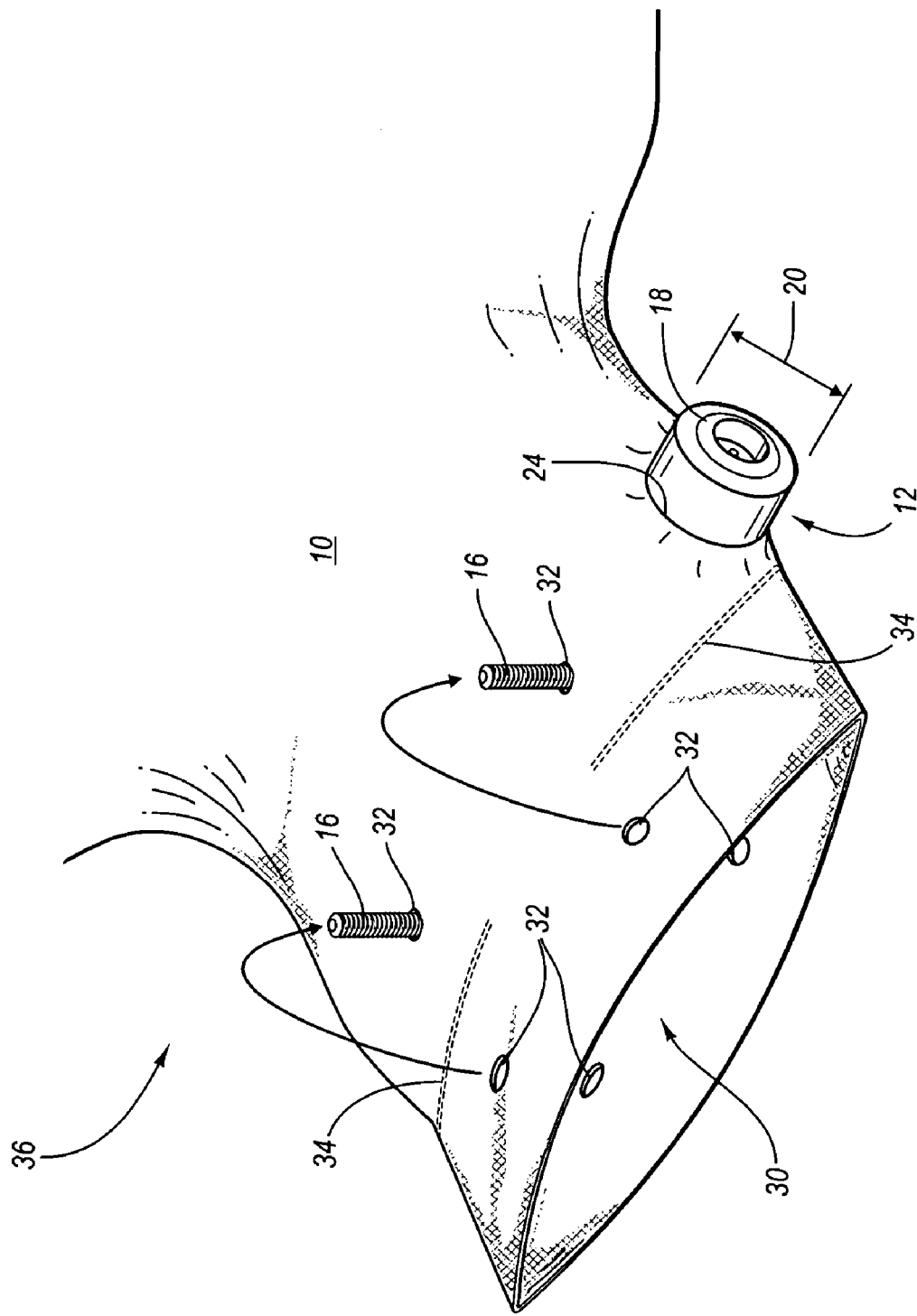
FIG. 2 is a perspective view of the inflatable fabric cushion of FIG. 1, with the inflator located within the cushion while exposing the inflator squib.
Figure 3:
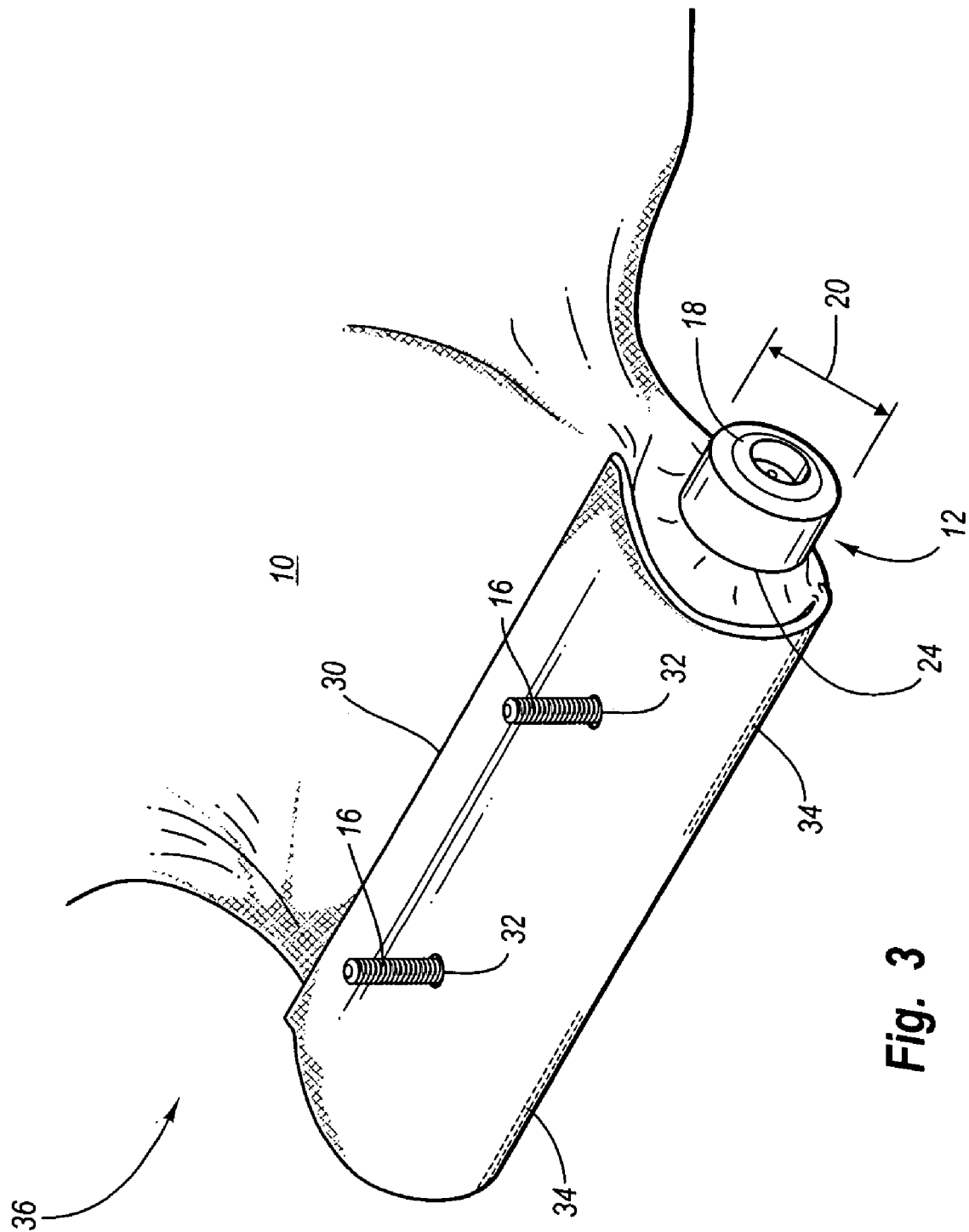
FIG. 3 is a perspective view of the inflatable fabric cushion of FIGS. 1 and 2, with its throat wrapped around the inserted inflator housing.

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 3, is not intended to limit the scope of the invention, as claimed, but is merely representative of presently preferred embodiments of the invention.

Figure 1:
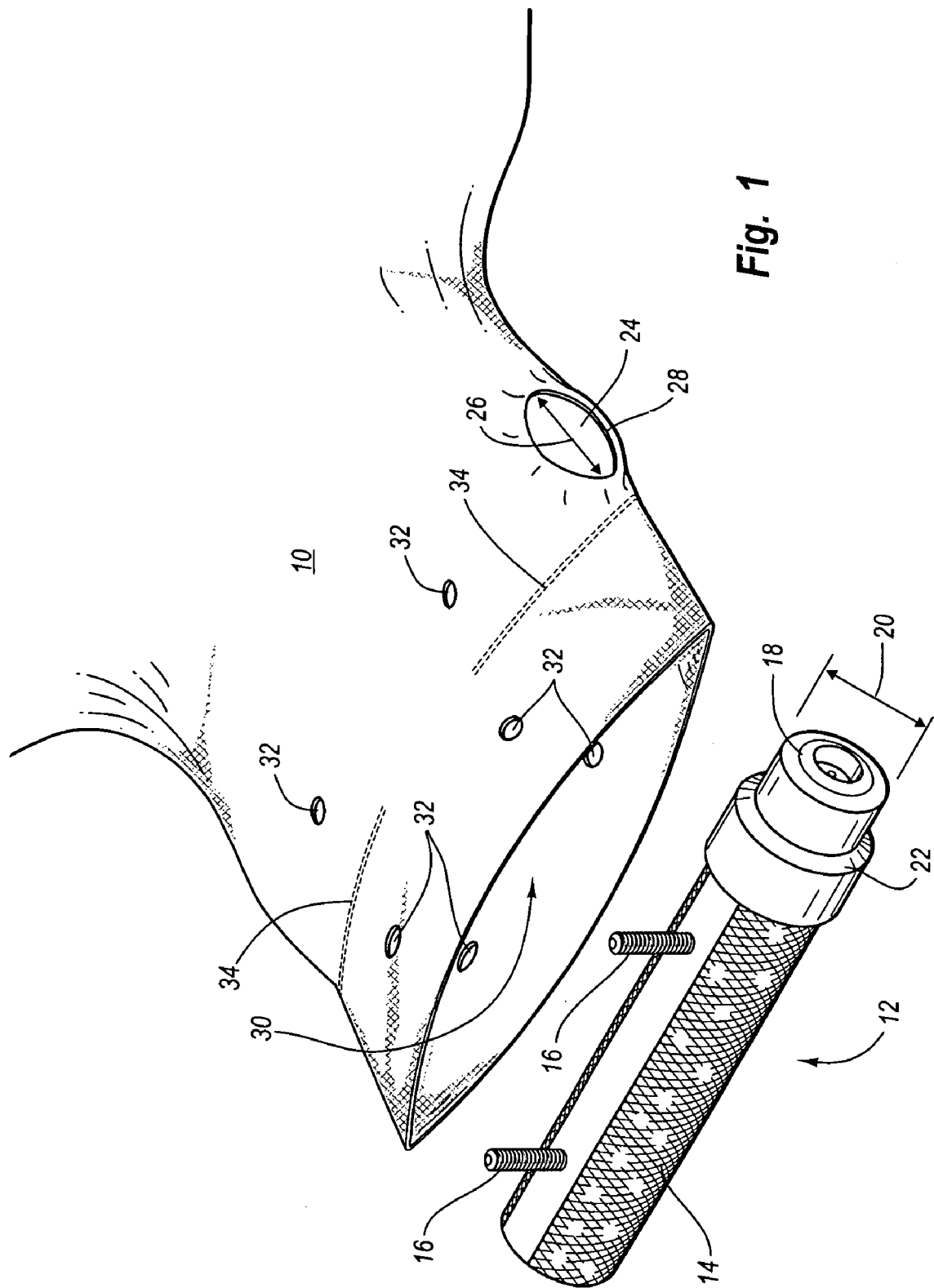
FIG. 1 is a perspective view of an inflatable fabric cushion and a corresponding inflator previous to insertion into the cushion.

Referring to FIG. 1, an inflatable fabric cushion 10 is depicted from a perspective view before an inflator 12 is inserted inside the inflatable cushion 10. The inflatable cushion 10 could be for a knee airbag or a side airbag or any similar restraint device that requires the maintenance of high internal pressures upon activation of the inflator 12. For knee airbag applications, the inflatable fabric cushion 10 provides a soft impact surface compared to currently available load distribution plates which are rigid and can themselves injure a vehicle occupant. High internal pressure is required to prevent an occupant's knees from knifing through the fabric airbag. The internal pressure typically achieved for a functional fabric knee airbag is approximately ten to fourteen pounds per square inch, which is two to three times that of conventional fabric airbags.

For side airbag applications, the inflatable cushion 10 must also have a high internal pressure when activated by the inflator 12 to break out of a module housing and through a seam in the seat. Moreover, side airbags need to maintain sufficient pressure to prevent strikethrough of an occupant through the airbag against the side of the vehicle.

The inflator 12 provides the internal pressure needed for the inflatable cushion 10 to function properly as a side or knee airbag. The inflator 12 may have a cylindrical housing 14 from which orthogonally projecting mounting studs 16 extend. The inflator housing could also be disc-shaped, rectangular or other shape. The mounting studs 16 are used to mount the inflator 12 to a desired location on a vehicle. Any number of mounting studs 16 may be used, or none at all, depending on how the inflator 12 is mounted within a vehicle. The inflator 12 also includes a squib 18 at one end which is the portion of the inflator 12 that is electrically initiated to trigger a pyrotechnic. The pyrotechnic uses the combustion of gas-generating material to generate inflation fluid. Alternatively, the inflator 12 could contain a stored quantity of pressurized inflation fluid or a combination of pressurized inflation fluid and ignitable material for heating the inflation fluid. The inflator squib 18 may have a diameter 20 smaller than the diameter of the inflator housing 14 adjacent the squib 18. A flange 22 or protruding rim thereby exists adjacent the inflator squib 18. Typical inflators 12 will have a squib 18 with a diameter 20 of about twenty millimeters. The diameter of the housing 14 would then typically increase to about thirty millimeters at the protruding rim or flange 22.

Referring still to FIG. 1, the inflatable cushion 10 has an opening 24. The opening 24 has a diameter 26 that is nearly equivalent to the diameter 20 of the inflator squib 18, in order to prevent the escape of inflation gases adjacent the inflator 12. The opening 24 may be a precision lasered hole where the diameter 26 is typically within one millimeter of the diameter 20 of the inflator squib 18. If a laser is used to create the opening 24, then the layers of the airbag wall 28 may be sealed or bonded together during the process of creating the opening 24.

The inflatable cushion 10 further has a throat 30 which functions as a passageway through which the inflator 12 may be inserted inside the inflatable cushion 10. Multiple mounting stud holes 32 may be located on the throat 30 or inflatable cushion 10 which receive the mounting studs 16 of the inflator 12. According to the embodiment depicted in FIG. 1, two lateral seams 34 restrict the size of the throat 30 opening so that the throat 30 is sealable when wrapped around the inflator 12 and cinched down in a desired mounting location of the inflatable cushion 10.

Referring to FIG. 2, the inflator 12 is shown from a perspective view within the interior of the inflatable cushion 10. As mentioned above, the inflatable cushion 10 is a safety restraint device made of fabric, such as a knee or side airbag, designed to withstand high internal pressure. The inflator 12 provides the internal pressure needed for the inflatable cushion 10 to function according to its intended purpose. The inflator 12 can be inserted into the interior of inflatable cushion 10 through the passageway provided by the throat 30 and by maneuvering the inflator 12 between the lateral seams 34 that restrict the throat 30 passageway. The inflator 12 could have orthogonally projecting mounting studs 16 that engage and project through mounting stud holes 32. The mounting stud holes 32 are located to correspond with and engage the mounting studs 16 and are located on either side of the lateral seams 34 on the throat 30. The orthogonally projecting mounting studs 16 on the inflator 12 are used to mount the airbag assembly 36 to a desired location on the vehicle.

The inflator squib 18 projects out of the opening 24 exposing the squib 18 to outside the inflatable cushion 10. An exposed inflator squib 18 eliminates the additional assembly tasks of electrical check and push/pull testing required for completely enclosed inflators. An exposed inflator 12 also eliminates the requirement for a wire harness. The diameter 26 of the opening 24 in the inflatable cushion 10 is sized to tightly circumscribe a portion of the inflator 12, like the inflator squib 18. With the inflator 12 partially projecting outside of the inflatable cushion 10, the opening 24 is sealed around the inflator squib 18 to prevent the escape of a large amount of inflation gas upon activation of the inflator 12.

The opening 24 provides an orifice separate from the throat 30 through which the inflator 12 may partially project outside of the inflatable cushion 10. The opening 24 is precisely formed to have a diameter commensurate with the diameter 20 of the inflator squib 18. Typically, the diameter of the opening 24 will be within one millimeter the size of the diameter 20 of the squib 18. This kind of precision in forming the opening 24 is achieved through the use of intense monochromatic coherent radiation, such as laser applications. A laser could create the opening 24 with great precision, thereby minimizing unintentional gaps between the opening 24 and the inflator 12. If the inflatable fabric cushion 10 were constructed using one-piece weaving technology, the airbag walls may be constructed of two layers. The laser would bond and seal these two layers together at the opening 24.

If the inflator squib 18 has a diameter 20 smaller than that of the inflator housing 14 because of the flange 22, only the squib 18, and not the remaining portions of the inflator 12, is able to project out of the opening 24. However, it is not necessarily required that the inflator 12 have a lip or flange 22 that increases the inflator diameter relative to the squib diameter 20. The mounting studs 32 mating with their corresponding mounting stud holes 32 prevent the inflator 12 from exiting the opening 24 when activated if the inflator 12 had a uniform diameter.

As presently illustrated in FIG. 2, the throat 30 is still open and would allow inflation gas to escape if not sealed. Consequently, the throat 30 is wrapped around the inflator housing 14 by engaging the mounting stud holes 32 on the throat 30 with the mounting studs 16 of the inflator 12. A fold line is created at approximately the location of the lateral seams 34. The lateral seams 34 restrict the throat 30 passageway and help to seal the throat 30 closed after being wrapped around the inflator 12. Once the airbag assembly 36 is installed into the desired area of a vehicle, the throat 30 is cinched down when the inflator 12 is mounted in position. The throat 30 is sealed thereby, preventing the escape of inflation gases upon deployment.

Referring to FIG. 3, the inflatable fabric cushion 10 of FIGS. 1 and 2 is depicted from a perspective view after the inflator 12 has been inserted through the throat 30, and the throat 30 is wrapped around the inflator 12 housing. The mounting stud holes 32 engage the inflator mounting studs 16 in a manner that keeps the throat 30 wrapped around the inflator 12 and allows the mounting studs 16 to project outside the throat 30 in order to be mounted to a desired location in a vehicle. The lateral seams 34 partially seal the throat 30, while the remaining throat portion between the lateral seams 34 is sealed when the airbag assembly 36 is cinched down into its mounting location in a vehicle. Once the airbag assembly 36 is mounted and cinched, the throat 30 is unable to unwrap from the inflator 12, thereby preventing the exiting of inflation gases upon activation of the inflator 12.

The inflator squib 18 is shown projecting out of the interior of the inflatable cushion 10 through the opening 24. The opening 24 is a precision lasered hole that is sized to be commensurate with the diameter 20 of the inflator squib 18. Typically, the opening 24 has a diameter within about one millimeter of the diameter 20 of the squib 18. By having the opening 24 tightly circumscribe the inflator squib 18, the opening 24 is sealed to prevent major leakage of inflation gases when the inflator 12 is activated.

By having the inflator squib 18 exposed, the need for a wire harness, additional electrical check and push/pull testing is eliminated. Instead of relying on these additional tests, manufacturers and those servicing airbags can be sure the electrical connection to the inflator 12 is properly connected by virtue of the exposed squib 18. The precision opening 24 also prevents the passage of inflation gas adjacent the inflator 12 when activated. Airbag assemblies 36 that require high internal pressure, such as side and knee airbag applications, will be able to maintain that pressure for a sufficient time to prevent an occupant from knifing through the cushion 10 in knee airbag applications, and ensure proper seat breakout in side airbag applications.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. An airbag assembly comprising:
    an inflatable cushion;
    a throat in the cushion for receiving an inflator into the cushion; and
    a precision opening in the cushion for receiving an inflator squib, the opening having a diameter corresponding in size to the inflator squib, wherein the inflator comprises a housing and the squib, wherein the throat is sealed by wrapping the throat around an inflator housing, wherein the opening is a precision lasered hole to minimize the passage of inflation fluid through the opening when circumscribing the inflator spuib.

2. The airbag assembly of claim 1, wherein the inflatable cushion is constructed of fabric material.

3. The airbag assembly of claim 1, wherein inflation fluid is prevented from passing through the throat upon activation of the inflator.

4. The airbag assembly of claim 1, wherein an electrical connection to the inflator is located on the inflator squib.

5. The airbag assembly of claim 4, wherein the inflator squib projects out of the opening to outside the inflatable cushion and the inflator housing is contained within the inflatable cushion.

6. The airbag assembly of claim 5, wherein the inflator squib has a diameter smaller than a diameter of a portion of the inflator housing.

7. The airbag assembly of claim 1, wherein the inflatable cushion is a knee airbag.

8. The airbag assembly of claim 1, wherein the inflatable cushion is a side airbag.

9. An airbag assembly, comprising:
    an inflatable fabric cushion;
    a throat in the inflatable cushion for providing an ingress to insert an inflator into an interior of the inflatable cushion; and
    a precision lasered hole in the inflatable cushion for receiving an inflator squib, the hole having a diameter equivalent to a diameter of the inflator squib, wherein the inflator comprises a housing and the squib, wherein the throat is wrapped around the inflator housing to seal the throat closed.

10. The airbag assembly of claim 9, wherein inflation fluid is prevented from passing through the throat upon activation of the inflator.

11. The airbag assembly of claim 10, wherein an electrical connection to the inflator is located on the inflator squib.

12. The airbag assembly of claim 11, wherein the inflator squib projects out of the hole to outside the inflatable cushion while the inflator housing is contained within the inflatable cushion.

13. The airbag assembly of claim 12, wherein the inflator squib has a diameter smaller than a diameter of a portion of the inflator housing.

14. An airbag assembly, comprising:
    an inflatable fabric cushion;
    an inflator having a housing and a squib, the inflator being partially contained within the inflatable cushion;
    a throat in the inflatable cushion through which the inflator can be inserted into the inflatable cushion; and
    a precision opening in the inflatable cushion through which the inflator squib projects to the outside of the inflatable cushion, the opening having a diameter corresponding in size to a diameter of the inflator squib, wherein the throat is sealed by wrapping the throat around the inflator housing.

15. The airbag assembly of claim 14, wherein the opening is a precision lasered hole to minimize the passage of inflation fluid through the opening when circumscribing the inflator squib.

16. The airbag assembly of claim 14, wherein inflation fluid is prevented from passing through the throat upon activation of the inflator.

17. The airbag assembly of claim 16, wherein the inflator has orthogonally projecting mounting studs, and the throat includes orifices corresponding in size to the mounting studs, the orifices engaging the mounting studs when the throat is wrapped around the inflator.

18. The airbag assembly of claim 14, wherein the inflator squib has a diameter smaller than a diameter of a portion of the inflator housing.

19. An airbag assembly, comprising:
    an inflator having a housing, a squib, and mounting studs projecting orthogonally from the housing;
    an inflatable fabric cushion having a plurality of orifices corresponding in size to the mounting studs;
    a throat in the inflatable cushion through which the inflator can be inserted into the inflatable cushion; and
    a precision lasered hole in the inflatable cushion through which the inflator squib projects to the outside of the inflatable cushion, the hole having a diameter equivalent to a diameter of the inflator squib.

20. The airbag assembly of claim 19, wherein the throat is wrapped around the inflator housing to seal the throat closed to prevent the passage of inflation fluid through the throat.

21. The airbag assembly of claim 20, wherein the orifices engage the mounting studs when the throat is wrapped around the inflator.

22. A method for maintaining a high internal pressure of a fabric airbag, comprising:
    obtaining an inflatable fabric cushion having a throat;
    forming a hole in the fabric cushion with a diameter the same size as a diameter of an inflator squib;
    inserting an inflator into the fabric cushion through the throat, the inflator having a housing and a squib;
    projecting the inflator squib outside the hole in the fabric cushion while maintaining the inflator housing inside the fabric cushion; and
    sealing the throat to prevent the passage of inflation fluid through the throat, wherein the throat is sealed by wrapping the throat around the inflator housing.

23. The method of claim 22, wherein the hole is formed in the fabric cushion through the use of a laser.

* * * * *